United States Patent [19]
Thorpe et al.

[11] 3,903,349
[45] Sept. 2, 1975

[54] ELECTRICALLY CONDUCTIVE CEMENT

[75] Inventors: Ian Thorpe; Terence Edwards, both of Tamworth, England

[73] Assignee: Doulton & Co. Limited, London, England

[22] Filed: May 9, 1973

[21] Appl. No.: 358,832

[30] Foreign Application Priority Data
May 10, 1972 United Kingdom............... 21991/72

[52] U.S. Cl. ................ 428/408; 117/226; 117/229; 252/502; 423/448; 427/122; 428/446; 428/454; 428/438
[51] Int. Cl.².......................................... C09C 1/44
[58] Field of Search ............ 252/502, 506; 204/294; 423/448; 117/226, 229

[56] References Cited
UNITED STATES PATENTS
| | | | |
|---|---|---|---|
| 1,017,483 | 2/1912 | Van Brunt .......................... | 252/502 |
| 2,886,476 | 5/1959 | Dumesnil et al. ................... | 252/502 |

FOREIGN PATENTS OR APPLICATIONS
| | | | |
|---|---|---|---|
| 1,171,236 | 11/1969 | United Kingdom................. | 252/502 |

*Primary Examiner*—Leland A. Sebastian
*Attorney, Agent, or Firm*—Baldwin, Wight & Brown

[57] ABSTRACT

An electrically conductive cement comprises from 95 to 46 percent by weight of sulfur, from 0 to 30 percent by weight of an inert filler effective to reduce contraction on setting, and from 5 to 25 percent by weight of powdered graphite.

6 Claims, No Drawings

ELECTRICALLY CONDUCTIVE CEMENT

This invention relates to an electrically conductive cement. An electrically conductive cement can be used, for example, as a mechanical jointing material in the assembly of high-voltage porcelain insulators and metal components used with them.

A "stabilised insulator" has a glazed surface layer which contains a semi-conductive material. This layer must be connected electrically with metal components used with the insulator, in order to allow current to flow through it. In a known stabilised insulator in which Portland cement is used to attach metal fittings, the requisite conductivity is present, but is due to the presence of water in the cement. However, the heating effect produced by current flowing through the cement results in the rapid drying of the cement when the insulator is in service, and this drying renders the cement non-conductive. Furthermore, the mode of conduction in the cement is ionic, and this may result in an undesirable migration of ions into the glazed surface layer. Ideally the mode of conduction should be electronic.

In order to overcome the disadvantage of using Portland cement, it is known to bond a layer of conductive material to the metal components and glazed surface layer to cover and to seal the Portland cement. This layer can comprise an epoxide resin composition containing aluminium powder as a conductive material. In service, however, this layer weathers, and eventually ceases to provide an effective electrical connection.

Alternatively, a flame-sprayed coating of an appropriate metal, e.g., lead, can be applied over the Portland cement, this metal being bonded to a lightly grit-blasted glazed surface. This method is suitable for a disc insulator, but it is difficult to apply it with metal fittings used with large post insulators, e.g., a "Multicone" insulator, having a large number of Portland cement connections.

It is an object of the present invention to provide an electrically conductive cement which is of sufficient mechanical strength to be used for the jointing of high-voltage porcelain insulators, and which will maintain an electrical connection between semi-conductive glazed surfaces by electronic conduction.

We have found that this object can be attained if a cement is prepared from a mixture of sulphur and sand, to which a certain proportion of powdered graphite has been added, so as to achieve the desired mechanical strength and electrical conductivity.

Thus, in accordance with the present invention, an electrically conductive cement comprises sulphur in the range of 95 to 46 percent by weight, e.g., 75 to 65 percent by weight, ground quartz sand in the range of 0 to 30 percent by weight, e.g., 5 to 15 percent by weight, and powdered graphite in the range of 5 to 25 percent by weight.

The use of a cement mixture containing sulphur, sand and graphite has been previously described (e.g., in U.K. Pat. Specification No. 1,171,236), but in this earlier case the graphite is used at a maximum concentration of 5 percent by weight, and is specifically chosen to be of colloidal form, having particles of sub-micron size. The graphite is used only to stabilise the sand suspension in the molten sulphur. The concentration is chosen specifically to ensure that particle-to-particle contact does not occur and thus impart conductivity to the mixture.

The powdered graphite used in accordance with the present invention is preferably of a fine grade, for example having 95 percent or more passing 100 mesh (B.S.), or more preferably having 97.5 percent or more passing 300 mesh (B.S.).

By using grades of graphite of different fineness, and varying the proportion of graphite used in the cement, the volume resistivity of the cement may be varied from 10 to 108 ohm-cm.

The invention also includes a method of making the electrically conductive cement defined above, comprising heating a mixture of the constituents until the sulphur has melted, and dispersing the remaining constituents in the liquid phase thus provided. The sulphur used to prepare the mixture of constituents just mentioned should desirably be in powdered form, notwithstanding that the sulphur subsequently forms a continuous phase.

The sand constituent limits the shrinkage of the cement as it cools, and within certain limits increases the mechanical strength. The graphite provides conductivity by particle-to-particle contact.

The conductive cement can be used, for example, in the assembly of all types of high-voltage insulators having semi-conducting glaze coatings, particularly Multicone post insulators, solid core insulators and disc insulators.

Examples are given below of electrically conductive cements made in accordance with the present invention.

| Example 1 | | |
|---|---|---|
| Graphite | (95% passing 100 mesh (B.S.)) | 15% |
| Sulphur | | 71.9% |
| Sand | | 13.1% |
| | Volume resistivity: $1.6 \times 10^6$ ohm-cm | |
| Example 2 | | |
| Graphite | (97.5% passing 300 mesh (B.S.)) | 15% |
| Sulphur | | 71.9% |
| Sand | | 13.1% |
| | Volume resistivity: $2.5 \times 10^4$ ohm-cm | |
| Example 3 | | |
| Graphite | (97.5% passing 300 mesh (B.S.)) | 20% |
| Sulphur | | 67.7% |
| Sand | | 12.3% |
| | Volume resistivity: $1.0 \times 10^2$ ohm-cm | |

In each Example, the mixture specified was heated until the sulphur had melted, and then the graphite and the sand (which was ground quartz sand) were completely dispersed in the liquid phase provided by the molten sulphur, by means of a mechanical stirrer.

In a modified cement according to the present invention the ground quartz sand is partly or wholly replaced by an inert filler other than ground quartz sand; the coefficient of thermal expansion of the said filler should be sufficiently low to reduce the contraction of the cement on setting to a value lower than that observable in the absence of the said filler and the ground quartz sand (if not wholly replaced).

The addition of the ground quartz sand and/or other inert filler having a low coefficient of thermal expansion will reduce the contraction of the cement on setting. This contraction of the cement can often be estimated with reasonable accuracy from a known sulphur concentration. The pouring properties of the molten cement mixture will depend on the sand and/or other filler and on the selection of powdered graphite of appropriate fineness.

The conductivity of the electrically conductive cement should preferably be at least 100 times greater than that of the glaze of the insulator with which it is to be used.

By a Multicone insulator, we mean herein an insulator of multi-conical construction, e.g., as sold under the trade name Doulton Multicone.

What is claimed is:

1. A high voltage stabilized porcelain insulator assembly having a surface layer of conducting glaze in which the glaze is connected electrically with the metal components used in the assembly, or the glazed layers of sprayed porcelain components are connected together, whereby a current is enabled to flow through the said layer or layers, said assembly including a jointing material providing an electrical connection between the conducting glazed surfaces by electronic conduction and consisting essentially of an electrically conductive cement which comprises from 95 to 46 percent by weight of sulfur, from 0 to 30 percent by weight of an inert filler effective to reduce contraction on setting, and over 5 and up to 25 percent by weight of powdered graphite.

2. The assembly of claim 1 wherein said conductive cement includes from 5 to 15 percent by weight of ground quartz sand.

3. The assembly of claim 2 wherein in said conductive cement at least 95 percent of the powdered graphite passes through a sieve having 0.152 mm apertures.

4. The assembly of claim 3 wherein the conductive cement includes from 75 to 65 percent by weight of sulfur.

5. The assembly of claim 1 wherein the conductive cement comprises substantially 72 percent by weight of sulfur, substantially 13 percent by weight of ground quartz sand, and substantially 15 percent by weight of powdered graphite.

6. The assembly of claim 1 wherein the conductive cement comprises substantially 68 percent by weight of sulfur, substantially 12 percent by weight of ground quartz sand, and substantially 20 percent by weight of powdered graphite.

* * * * *